United States Patent [19]

Ohnishi et al.

[11] 4,261,051
[45] Apr. 7, 1981

[54] TIME-DIVISION-MULTIPLEXED EXCHANGER

[75] Inventors: Makoto Ohnishi, Tokyo; Hirotoshi Shirasu, Yokohama, both of Japan

[73] Assignee: Hitachi, Ltd., Japan

[21] Appl. No.: 42,414

[22] Filed: May 25, 1979

[30] Foreign Application Priority Data

Jun. 2, 1978 [JP] Japan .................................. 53-65818

[51] Int. Cl.³ ........................ H04Q 11/04; H04B 3/36
[52] U.S. Cl. .................................... 370/58; 179/16 F; 179/170 R; 364/724
[58] Field of Search ........ 179/15 AT, 15 AE, 15 BL, 179/15 AV, 170 R, 170.2, 170.8, 16 F; 364/724; 370/58, 97, 6, 7

[56] References Cited

U.S. PATENT DOCUMENTS

| 3,699,325 | 10/1972 | Montgomery et al. | 179/15 BL |
| 3,823,275 | 7/1974 | La Marche et al. | 179/170.2 |
| 3,828,145 | 8/1974 | Carbrey | 179/15 AT |
| 4,051,332 | 9/1977 | Izumi et al. | 179/170.2 |
| 4,057,695 | 11/1977 | Ohno | 179/170 R |
| 4,146,931 | 3/1979 | Delforge | 364/724 |

FOREIGN PATENT DOCUMENTS 7900757 1/1979 Netherlands.

Primary Examiner—Douglas W. Olms
Attorney, Agent, or Firm—Craig & Antonelli

[57] ABSTRACT

In a time-division-multiplexed exchanger having digital filters disposed in a channel system, a level adjuster wherein data for setting line losses corresponding to respective combinations of interconnections of a plurality of lines received at outgoing and incoming line terminals of the time-division-multiplexed exchanger are stored by storage means, and coefficients of the digital filters are controlled on the basis of the data at exchange operations, whereby the level adjustment is made.

4 Claims, 3 Drawing Figures

TIME-DIVISION-MULTIPLEXED EXCHANGER

BACKGROUND OF THE INVENTION

This invention relates to a time-division-multiplexed telephone exchanger, and more particularly to a level adjuster for a line connected with the exchanger.

In general, in a telephone exchanger, the line loss becomes heavy when a large number of transit lines are connected. It is therefore desirable to reduce the line loss by the use of a 4-wire switching system. However, when the line loss is reduced excessively, various problems such as singing, echo etc. arise. It is accordingly necessary to insert a level adjuster (pad) into the line and to adjust the line loss of the transit line. Since the pads are installed on the individual outgoing and incoming lines (local transit lines) of the exchanger, they are required in large quantities. Another disadvantage is that, in operating the lines, the change of the adjustment is complicated.

SUMMARY OF THE INVENTION

An object of this invention is to realize the line loss-adjusting function in a time-division-multiplexed exchanger by means of a simple circuit arrangement.

Another object of this invention is to provide a level adjuster circuit in a time-division-multiplexed exchanger which is free from the deterioration of the signal-to-quantized noise ratio.

A further object of this invention is to provide a level adjuster circuit in a time-division-multiplexed exchanger which can readily alter and maintain line loss characteristics.

In order to accomplish these objects, according to this invention, in a time-division-multiplexed telephone exchanger wherein digital filters are disposed in a channel system, data on line loss characteristics corresponding to the combinations of voice telephone lines which are received at outgoing and incoming line terminals of the exchanger and which are to be exchanged are stored in a memory in advance, and the data is read out during an exchange operation so as to control the coefficients of the digital filters in correspondence with the stored data.

DESCRIPTION OF THE PREFERRED EMBODIMENTS

Before the detailed description of this invention, the outline of a time-division-multiplexed exchanger and a prior-art pad control will be described.

Figure 1:
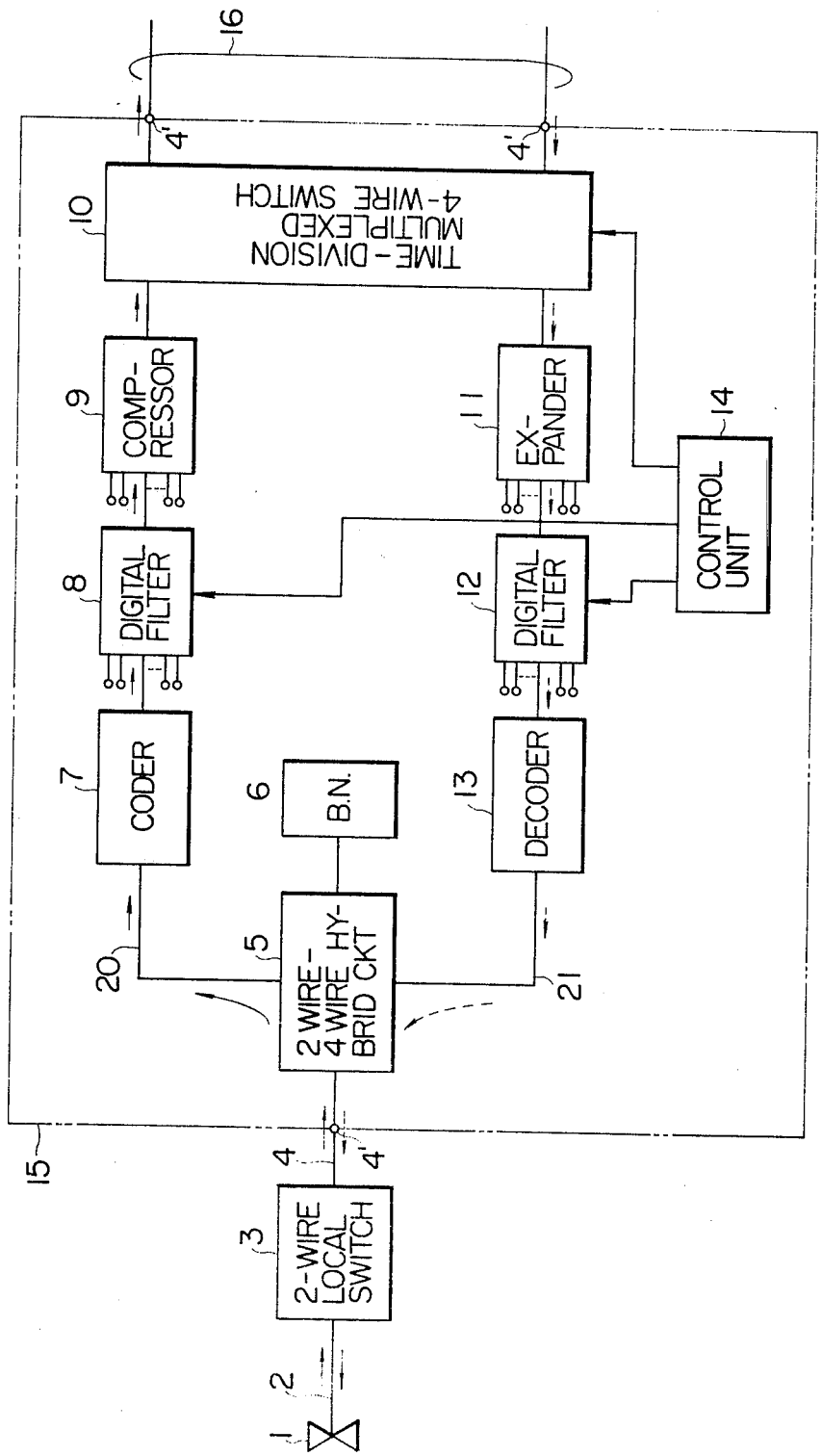
FIG. 1 is a schematic block diagram of a time-division-multiplexed exchanger for explaining this invention.

In FIG. 1, numeral 1 designates a subscriber, numeral 2 a subscriber line, numeral 3 a 2-wire local switch, numeral 4 a 2-wire transit line (outgoing and incoming line), numeral 4' an outgoing and incoming line terminal, numeral 15 a time-division-multiplexed toll switch, numeral 5 a 2-wire-4 wire hybrid circuit, numeral 6 a balancing network, numeral 7 a coder (voice-to-linear PCM converting circuit), numeral 8 a digital filter, numeral 9 a compressor (linear PCM-to-companded PCM converting circuit), numeral 10 a time-division-multiplexed 4-wire switch, numeral 11 an expander (companded PCM-to-linear PCM converting circuit), numeral 12 a digital filter, numeral 13 a decoder (linear PCM-to-voice converting circuit), numeral 14 a control unit of the time-division-multiplexed toll switch 15, numeral 16 a 4-wire transit line, numeral 20 an outgoing line, and numeral 21 an incoming line.

In this construction, outgoing call current from the telephone subscriber 1 arrives at the toll switch 15 through the subscriber line 2, the local switch 3 and the transit line (outgoing and incoming line) 4 in the direction of the arrows shown in solid lines. By way of the 2 wire-4 wire hybrid circuit 5 the outgoing current is applied to the coder 7, in which it is converted into a linear PCM signal. Further, the linear PCM signal is band-limited by the digital filter 8 and is converted into a companded PCM signal by the compressor 9. After an exchange operation has been made by the time-division-multiplexed switch 10, the signal is transmitted to the transit line 16. The time-division multiplexing may be executed in the digital filter 8 and the compressor 9 as well.

As regards an incoming operation, call current flows in the direction of the arrows shown in dotted lines. A companded PCM signal transmitted by the toll transit line 16 is exchanged by the time-division-multiplexed switch 10, and is subsequently converted into a linear PCM signal by the expander 11. This signal is band-limited by the digital filter 12, and is restored to the voice call current by the decoder 13. This voice call current passes through the 2 wire-4 wire hybrid circuit 5, and reaches the subscriber 1 via the route indicated by the arrows shown in dotted lines.

In the outgoing and incoming operations described above, when there is an impedance mismatching in the 2-wire section or the 2 wire-4 wire hybrid portion, reflection waves appear and flow backward to give rise to singing. In the prior art, therefore, the pads have been respectively inserted between the 2 wire-4 wire hybrid circuit 5 and the coder 7 and between the former and the decoder 13. Since, however, the pads are installed for the individual outgoing and incoming lines of the exchanger, they are required in large quantities, and the change of the adjustment is complicated in operating the lines.

On the other hand, according to this invention, the function of deterring the occurrence of singing on the line is brought forth in such a way that the setting of a call line loss, i.e., the pad control is made by altering the coefficients of the digital filters 8 and 12 in the exchanger. To this end, in accordance with the present invention, line loss characteristics which correspond to the combinations of lines to be exchanged are filed in a memory (storage device) within the control unit 14 in advance, and they are read out at the time the exchange operations are carried out so as to set the digital filter coefficients to the required predetermined characteristics.

With the pad control method of this invention, the large number of level adjusters which have hitherto been installed in correspondence with the plurality of outgoing and incoming lines of the exchanger can be removed, and the exchanger can be rendered economical and small in size. The change of the line loss characteristics in the operation of the lines can be coped with by altering the memory contents, and also the maintenance etc. is made easy. Further, since the level adjustment (pad) can be executed at the linear PCM stage, the linear PCM-to-companded PCM conversion is unnecessary unlike the digital pad in which the level adjustment is executed at the companded PCM stage, and hence, the deterioration of a signal-to-quantized noise ratio is not incurred.

Figure 2:
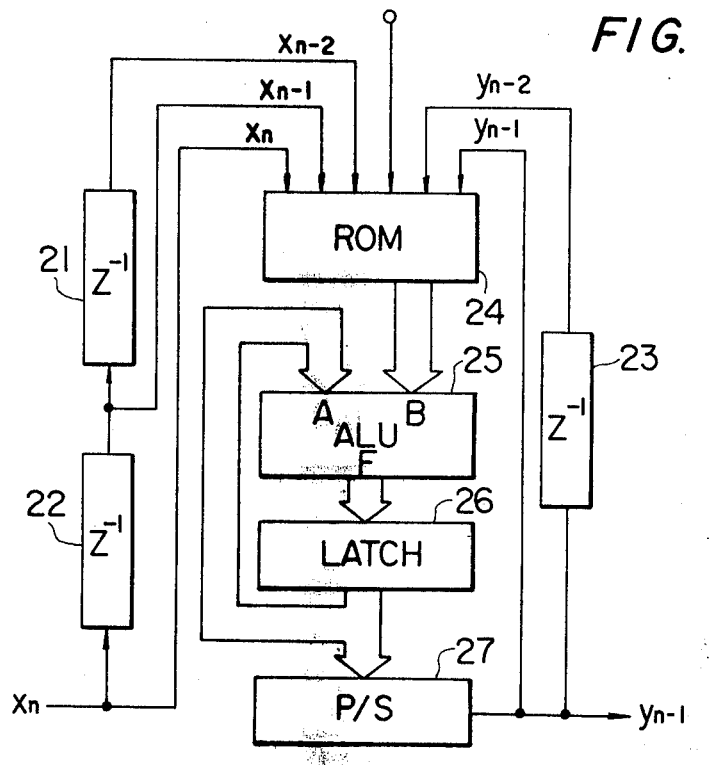
FIG. 2 is a circuit arrangement diagram showing an embodiment of the essential portions of this invention.

FIG. 2 is a diagram showing an embodiment of a digital filter in this invention. In the illustration, a 2nd order recursive digital filter is constructed of a combinatorial digital filter which employs a ROM (read only memory). Numerals 21 and 22 designate delay shift registers for input data, numeral 23 a delay shift register for output data, numeral 24 a ROM, numeral 25 an arithmetic-logic unit, numeral 26 a latch, and numeral 27 a register for serialization. The operation of the digital filter is expressed by the following differential equation:

$$y_n = a_0 x_n + a_1 x_{n-1} + a_2 x_{n-2} + b_1 y_{n-1} + b_2 y_{n-2} \quad (1)$$

Here, $x_j$ denotes input data, $y_j$ output data, $a_j$ a coefficient by which the input data is multiplied, and $b_j$ a coefficient by which the output data is multiplied. By substituting the binary notations of data:

$$x_n = -x_n^{(O)} + \sum_{i=1}^{m-1} 2^{-i} x_n^{(i)}$$

$$y_n = -y_n^{(O)} + \sum_{i=1}^{m-1} 2^{-i} y_n^{(i)}$$

into Equation (1), and rearranging the terms, the following equation is obtained:

$$y_n = -\phi^{(O)} + \sum_{i=1}^{m-1} 2^{-i} \phi^{(i)} \quad (2)$$

Here, $\phi^{(i)}$ is expressed by:

$$\phi^{(i)} = a_0 x_1^{(i)} + a_1 x_2^{(i)} + a_2 x_3^{(i)} + b_1 y_1^{(i)} + b_2 y_2^{(i)} \quad (3)$$

which is written in the ROM 24 in advance. $x_1^{(i)} - x_3^{(i)}$, $y_1^{(i)}$ and $y_2^{(i)}$ are inputs of the ROM, and correspond to the i-th bits of $x_n$, $x_{n-1}$, $x_{n-2}$, $y_{n-1}$ and $y_{n-2}$. The value $\phi^{(i)}$ read out is applied to a B input terminal of the arithmetic-logic unit 25, and is added to an addition result preceding one clock as stored in the latch 26. At this time, the addition result preceding one clock is multiplied by $2^{-i}$. That is, the addition result is added to the output of the ROM 24 under the condition under which it is shifted one bit onto the LSB side. Further, when the ROM output of the final bit is subjected to a subtraction, the final output becomes:

$$y_n = -\phi^{(O)} + \sum_{i=1}^{m-1} 2^{-i} \phi^{(i)}$$

which agrees with Equation (2). Thus, the digital filtering operation becomes possible owing to the construction of FIG. 2. The final output is serialized by the register 27 and is delivered therefrom. In order to cause this digital filter to effect the pad operation, the coefficient $a_j$ by which the input data is multiplied may be multiplied by a loss coefficient $A_k$. Assuming by way of example that a pad operation of two levels is to be effected, the following equations may be resorted to:

$$\begin{cases} \phi^{(i)} = \phi_1^{(i)} \alpha + \phi_2^{(i)} \overline{\alpha} \\ \phi_k^{(i)} = A_k (a_0 x_1^{(i)} + a_1 x_2^{(i)} + a_2 x_3^{(i)}) + b_1 y_1^{(i)} + b_2 y_2^{(i)} \end{cases}$$

Here, $\alpha$ denotes a signal for the scale control of coefficients as is additionally applied to the ROM. According to this embodiment, the digital filter is enabled to execute the pad control merely by increasing the input terminals of the ROM. When it is desired to switch a large number of levels, the inputs of the ROM may be increased more.

Figure 3:
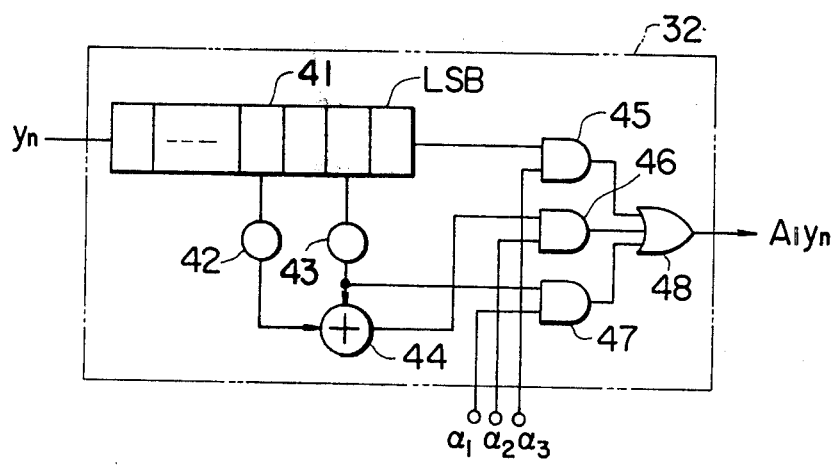
FIG. 3 is a circuit arrangement diagram showing another embodiment of the essential portions of this invention.

FIG. 3 is a diagram showing another embodiment of this invention.

In the figure, numeral 32 indicates a multiplier unit whose coefficient is variable. Upon applying control signals to external terminals $\alpha_1$, $\alpha_2$ and $\alpha_3$, the multiplier 32 has the coefficient $A_i$ varied and is thereby able to control the magnitude of its output $A_i y_n$. There are various methods of constructing the multiplier 32, and by way of example, the construction as shown in FIG. 3 can be employed. Referring to the figure, numeral 41 indicates a shift register, numerals 42 and 43 latches, numeral 44 an adder, numerals 45, 46 and 47 AND gates, and numeral 48 an OR gate. In the illustration, the latches 42 and 43 derive outputs from the fourth bit and the second bit as reckoned from the LSB of the shift register 41 respectively, and they serve to prolong the sign bits in time. In this way, signals provided from the latches 42 and 43 come to have amplitudes equal to $\frac{1}{8}$ and $\frac{1}{2}$ of that of an input signal $y_n$ respectively. Accordingly, the output of the adder 44 becomes a magnitude which is $\frac{5}{8} = 0.625$ times the input signal $y_n$. When the gates 45, 46 and 47 are respectively enabled by the external control signals $\alpha_1$, $\alpha_2$ and $\alpha_3$, outputs equal to 1 (one), 0.625 and 0.5 times the input $y_n$ can be respectively obtained at the output terminal $A_i y_n$. Accordingly, the signal into which the input signal has been attenuated by the control signal $\alpha_1$, $\alpha_2$ or $\alpha_3$ can be obtained. With the method based on this embodiment, the multiplier unit can be constructed of the shift register, the adder and the few gates. By properly selecting the taps to be taken out from the shift register 41, it is possible to obtain any desired quantity of attenuation. As the shift register 41, there can be employed one included in the digital filter, for example, the delay shift register for output data 23 when the digital filter has the construction of FIG. 2. Thus, the level adjustment is permitted with the simple circuit arrangement.

Although, in the above description of the second embodiment, the combinatorial type digital filter has been taken as an example, it is needless to say that the invention is also applicable to other type of digital filters. For example, the invention is also applicable to the case where a standard type digital filter is used. In this case, the coefficient multiplier unit which is not on the feedback side can be diverted as the multiplier unit 32.

We claim:

1. A time-division-multiplexed exchanger comprising:
   a time-division-multiplexed switch for establishing interconnections between subscriber's lines;
   a coder for converting voice signals from one of said subscriber's lines to pulse code modulation signals;

a decoder for converting pulse code modulation signals to voice signals to be transmitted to said one subscriber's line;

digital filters coupling the output of said coder and the input of said decoder to said time-division-multiplexed switch, respectively;

adjusting means, inserted in the output side of said respective digital filters, for adjusting the level of the pulse code modulation signals, said adjusting means having first means for receiving the output of said digital filter and for outputting plural sets of pulse code modulation signals having different signal levels with respect to each other, and second means for selecting one of said plural sets of pulse code modulation signals as the output of said adjusting means; and control means for controlling said time-division-multiplexed switch and said second means in accordance with the selected combinations of said subscriber's lines to be interconnected.

2. A time-division-multiplexed exchanger according to claim 1, wherein said first means comprises:

a shift register having a plurality of bit stages for storing the output of said digital filter and for outputting the contents from different bit stages thereof; and at least one latch means, connected to a bit stage excepting the least significant bit of said shift register, for providing one set of pulse code modulation signals with prolonged sign bit signals;

said second means selecting the output of said adjusting means among the output of said latch means and the output from the least significant bit stage of said shift register.

3. A time-division-multiplexed exchange according to claim 2, wherein said first means includes at least two of said latch means and further comprising:

at least one adder means, connected to at least two of said latch means, for adding the output of respective latch means and providing one set of pulse code modulation signals to said second means.

4. A time-division-multiplexed exchange according to claim 2 or 3, wherein said digital filter comprises:

input means to which pulse code modulation signals from one of said coder and said time-division-multiplexed switch are supplied; and calculating means, coupled to said input means, for multiplying the pulse code modulation signals by coefficients;

said shift register of first means being connected to said calculating means so as to receive the output of the calculating means, and the output from the least significant bit stage of said shift register being fed back to said input means, thereby to form a recursive digital filter.

* * * * *